United States Patent [19]

Soster et al.

[11] Patent Number: 4,611,735
[45] Date of Patent: Sep. 16, 1986

[54] DEVICE FOR SPLITTING AT LEAST ONE OPTICAL FIBRE

[75] Inventors: Marie C. Soster, Rueil Malmaison; Roger Anastasie, Paris, both of France

[73] Assignee: Socapex, Suresnes, France

[21] Appl. No.: 692,126

[22] Filed: Jan. 17, 1985

[30] Foreign Application Priority Data

Jan. 20, 1984 [FR] France ................. 84 00891

[51] Int. Cl.⁴ ............................................. C03B 37/16
[52] U.S. Cl. ....................................... 225/96.5; 225/2; 225/105
[58] Field of Search ................... 225/2, 96.5, 96, 104, 225/101, 105

[56] References Cited

U.S. PATENT DOCUMENTS 4,027,814  6/1977  Gloge et al. ................. 225/104
4,036,419  7/1977  Hensel et al. ................ 225/96.5
4,154,385  5/1979  Lewis .......................... 225/96.5
4,159,793  7/1979  Belmonte ..................... 225/96.5
4,202,475  5/1980  Hirai et al. .................. 225/2
4,473,942  10/1984 Ridgway ....................... 225/96.5 X

FOREIGN PATENT DOCUMENTS 3126852  5/1983  Fed. Rep. of Germany .

Primary Examiner—Frank T. Yost
Attorney, Agent, or Firm—Oblon, Fisher, Spivak, McClelland & Maier

[57] ABSTRACT

For splitting an optical fibre the same is disposed on a flexible support. Two clamping devices bear onto the fibre and the flexible support, and a tool initiates the splitting of the fibre. The support is bent until the fibre is split. A cam controls the movements of the tool through a control rod and the movements of said clamping device by means of a roller integral with a movable slide.

9 Claims, 36 Drawing Figures

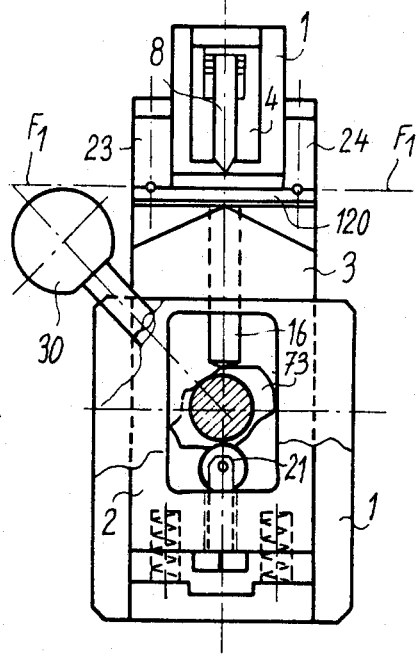
FIG_1-a
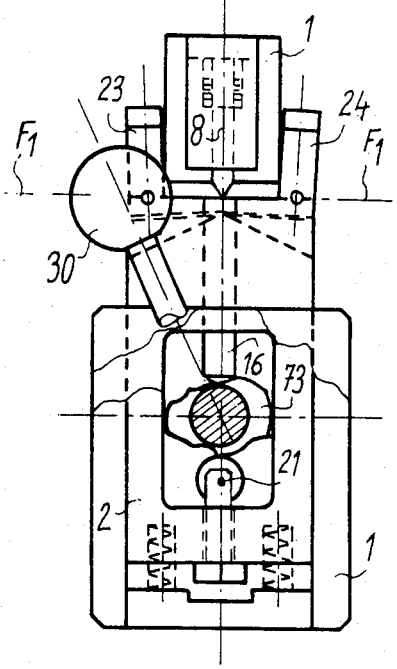
FIG_1-b
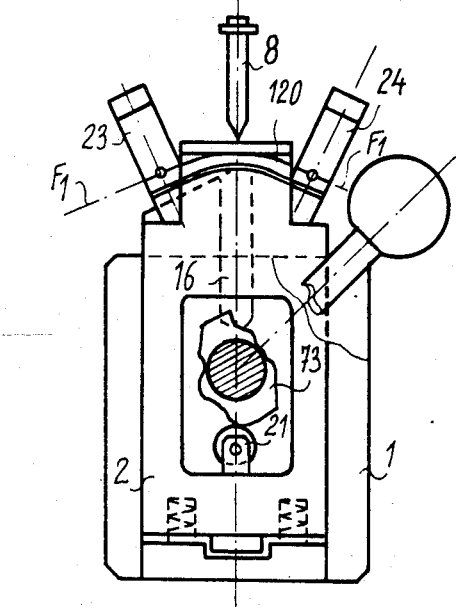
FIG_1-c
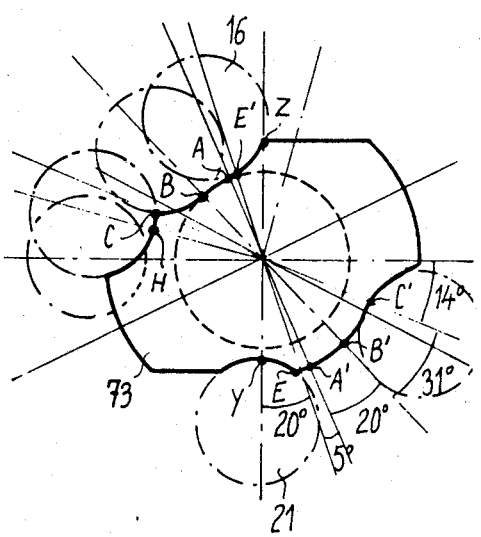
FIG_2

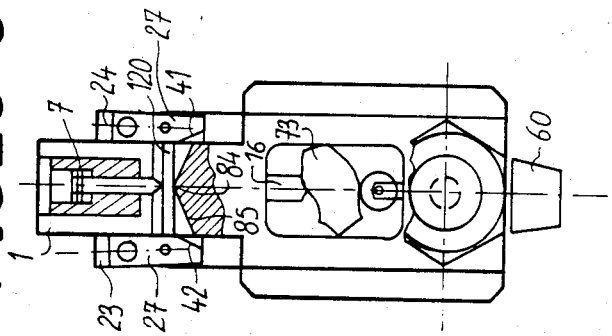
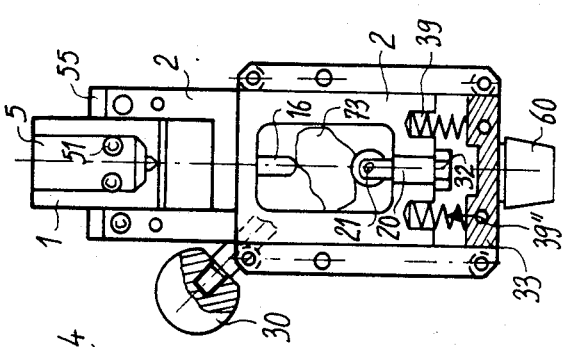
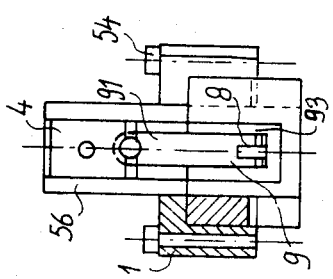
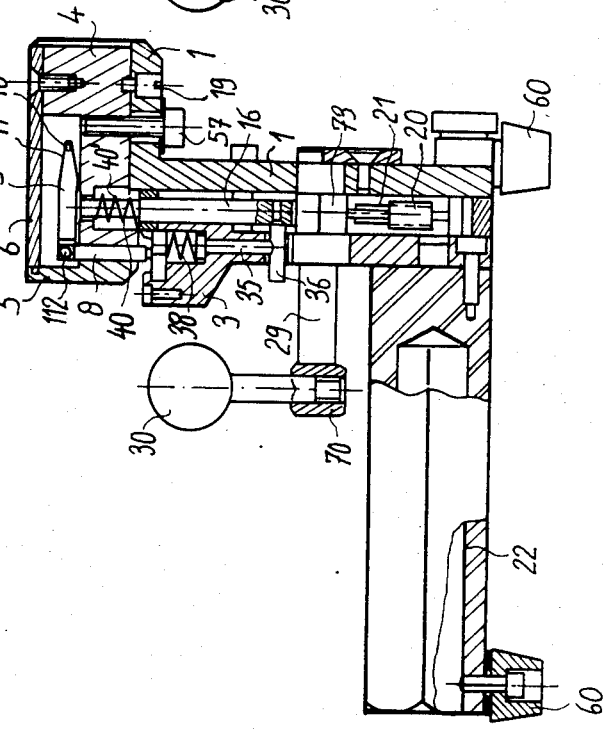

FIG_4-b 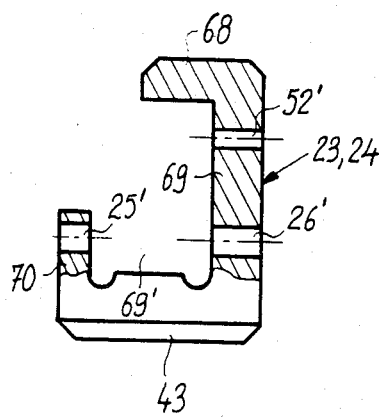
FIG_4-c 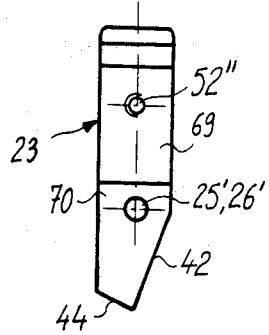
FIG_4-d 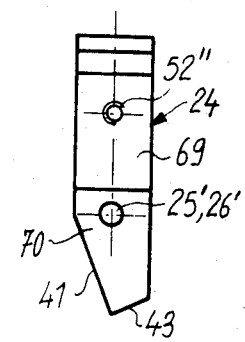
FIG_4-a 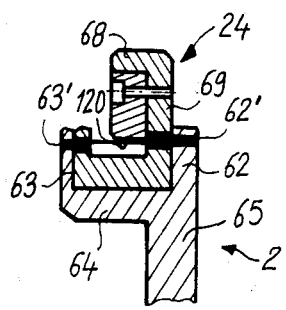
FIG_4-e 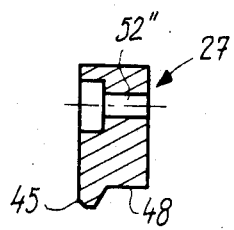
FIG_4-f 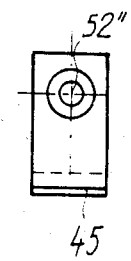
FIG_4-g 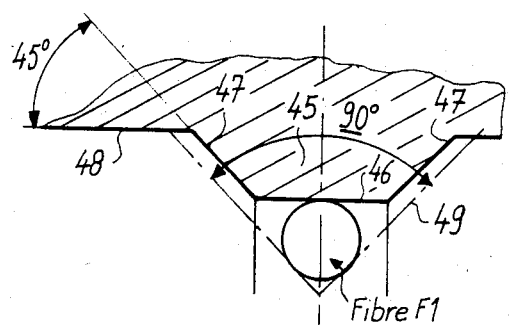

FIG_5-a
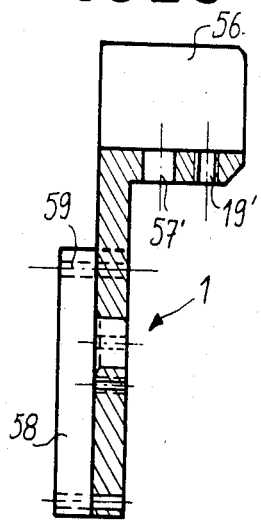
FIG_5-b
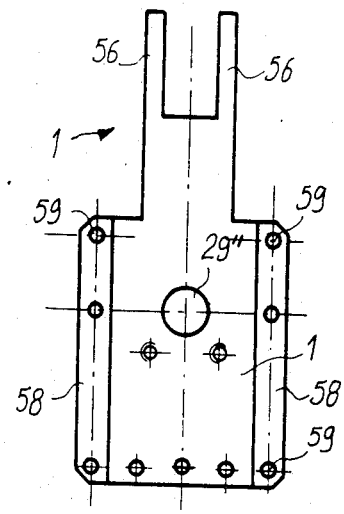
FIG_6-a
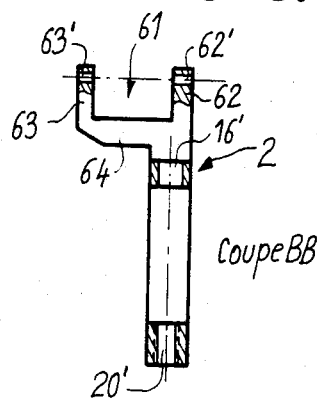
FIG_6-b
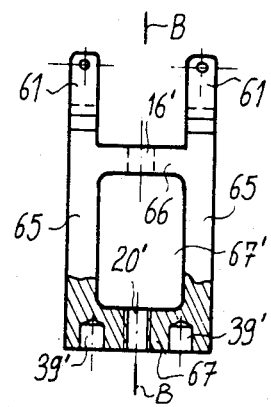
FIG_7-a
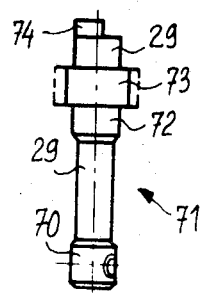
FIG_7-b
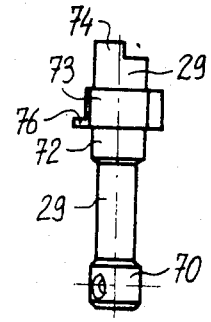

FIG_8-a
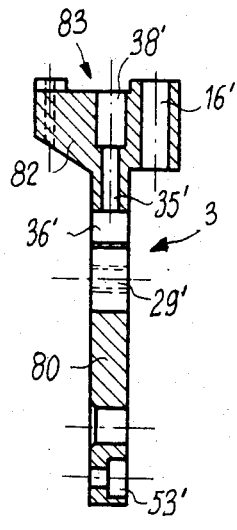
FIG_8-b
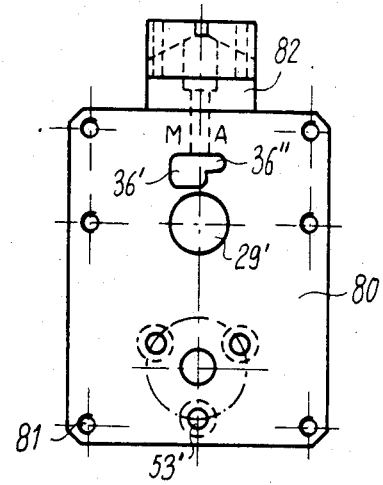
FIG_8-c
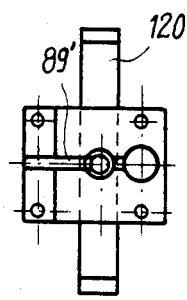
FIG_8-d
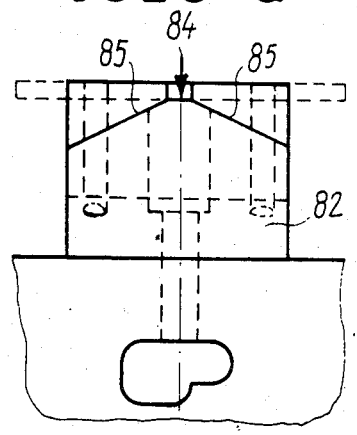
FIG_8-e
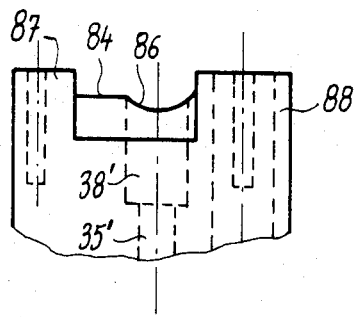

FIG_9-a
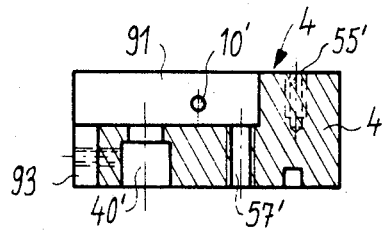
FIG_9-b
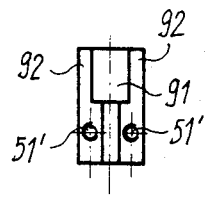
FIG_9-c
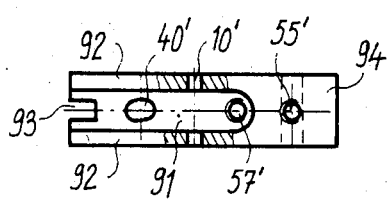
FIG_10-a
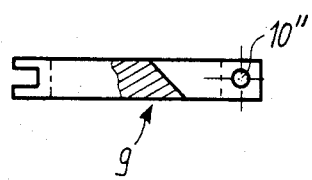
FIG_10-b
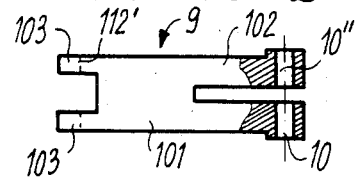
FIG_11-a
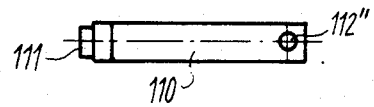
FIG_12-a
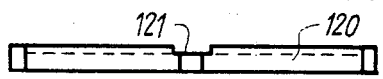
FIG_11-b
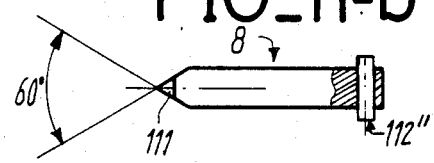
FIG_12-b
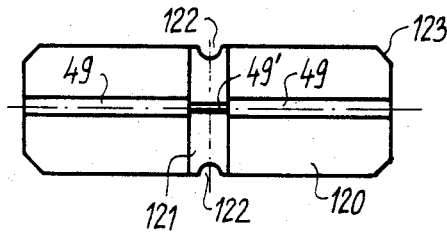
FIG_12-c
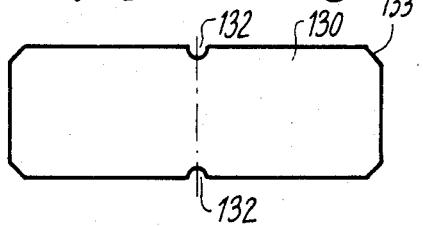

4,611,735

DEVICE FOR SPLITTING AT LEAST ONE OPTICAL FIBRE

BACKGROUND OF THE INVENTION

The present invention is related to a device for splitting or cleaving at least one optical fibre.

French patent specification No. 2 399 310 filed on July 31, 1978 discloses a cleaving or splitting device in which a plurality of optical fibres are fixed by means of a clamping collar or a clamp onto a supporting sheath portion. The bare fibre ends projecting from the sheath portions are maintained in grooves by an elastic element. A cutting member constituted by a knife initiates the splitting of the fibres. In the cutting area the fibres are placed onto an elastic element, e.g. a rubber element, under which a spring leaf is located. The splitting of the fibre is performed by bending the spring leaf and the elastic element so as to exert a force on the bare fibres which causes rupturing of the fibres along the marked points, thus producing the required surfaces perpendicular to the axes of the fibres.

One major drawback of the device described in this prior publication resides in the fact that it requires, for each operation, mechanical mounting of the clamps for the optical fibres to be split.

The present invention is aimed at providing a device which allows this drawback to be overcome due to the fact that the fixing in the desired position of the fibres is effected by means that are also used for bending or flexing the flexible support.

SUMMARY OF THE INVENTION

It is thus an object of the invention to provide a device for splitting at least one optical fibre, comprising a split initiating tool and means for exerting on said optical fibre forces for performing the splitting, said fibre being placed for this purpose onto a flexible support, said means for exerting forces on the optical fibre comprising means for bending said flexible support and for holding the optical fibre on either side of the location where said tool initiates the splitting, in such a manner that the fibre is held on said support so as to prevent any sliding of said fibre when said flexible support is bent, wherein said means for bending said flexible support and holding said optical fibre are constituted by two rotatively movable clamps disposed in such a manner that they bear on said optical fibre and on said support so as to cause, when rotated, the bending of the flexible support as well as the holding of said optical fibre.

In one embodiment of the invention the displacement of motion of the two clamps is controlled by a movable slide. Advantageously both clamps can be mounted each on a clamp-holder through which they extend and which is rotatively movable on said movable slide. The axis of rotation of at least one of said clamp-holders is preferably located substantially in the plane of said flexible support.

In a preferred embodiment the movable slide is actuated by a cam and comprises an adjustable finger cooperating with said cam.

The split initiating tool can also be controlled or actuated by said cam. In this case the actuation of the split initiating tool can be ensured by a rod cooperating with said cam and actuating a lever which supports said tool. Advantageously the cam has profiles formed on two opposite sectors one of which corresponds to the control of the splitting tool, while the other one corresponds to the control of the movable slide. Said slide may be provided with an aperture receiving said cam.

The cam can be profiled so that it performs the following sequence:

clamping the fibre and pre-bending of the flexible support;

lowering the tool for initiating the splitting of the optical fibre;

raising the tool;

bending the flexible support until rupturing of the fibre occurs.

BRIEF DESCRIPTION OF THE DRAWING

Other objects, features and advantages of the invention will become apparent from the following detailed description which is given by way of illustration, but not of limitation, and which refers to the appended drawing wherein:

FIGS. 1a to 1c show a device according to the invention in the rest position, the split initiating position and the bending position, respectively;

FIG. 2 is a detailed view of the cam and the different operating positions it is adapted to assume;

FIGS. 3a to 3d show a device according to the invention, represented in longitudinal section, in side view, in side, view with portions being torn-off and in plan view, respectively;

FIGS. 4a to 4d show the mounting of a clamp-holder according to the invention, a sectional side view of each one of the clamp-holders according to the invention;

FIGS. 4e, 4f and 4g are a sectional side view and a detail view, respectively, of a clamp mounted on the clamp-holder according to the invention;

FIGS. 5a and 5b show a main body according to the invention, in sectional side view and in front view, respectively;

FIGS. 6a and 6b show a sectional side view and a front view, respectively, of the lower part of a movable slide according to the invention;

FIGS. 7a and 7b are a side view and a plan view, respectively, of a cam according to the invention;

FIGS. 8a to 8e show a fibre rest-holder according to the invention, in front view, plan view and two detail views, respectively;

FIGS. 9a to 9c show a cross-sectional side view and a plan view, partially in section, of a diamond-holder according to the invention;

FIGS. 10a and 10b show a diamond control lever according to the invention, in side view and in plan view, respectively;

FIGS. 11a and 11b are a side view and a front view, respectively, of a diamond-holder according to the invention;

FIGS. 12a and 12b are a side view and a plan view, respectively, of a flexible support according to the invention;

FIGS. 12c is a plan view showing a foil for supporting the flexible support.

DETAILED DESCRIPTION OF A PREFERRED EMBODIMENT

FIGS. 1a to 1c schematically illustrate the main stages of the operation of the device according to the invention. One or more optical fibres $F_I$ are disposed on a flexible support 120. A main body 1 receives a holder for a cutting tool 8 adapted to initiate the splitting of fibre $F_I$. Disposed on either side of cutting tool 8 are two clamp-holders 23 and 24 integral with a movable slide 2. Said clamp-holders support each a clamp which is adapted to bear on flexible support 120 while maintaining the optical fibre on the same and preventing said fibre from sliding. Due to this structure it is not necessary to clamp the fibre separately onto the flexible support.

A cam 73 actuates, on the one hand, a rod 16 which controls the displacements of the cutting tool-holder 8 and, on the other hand, at its lower part, a roller 21 integral with movable slide 2. Thus, the rotation of cam 73, which is manually controlled by a control lever 30, coordinates the conjugated action of clamp-holders 23 and 24 actuated by movable slide 2 and of cutting tool 8 actuated by rod 16.

As shown in FIG. 1a the device is in its rest position, i.e. the clamps of clamp-holders 23 and 24 do not engage flexible support 120 and cutting tool 8 is in its raised position.

In FIG. 1b cutting tool 8 is shown to be in contact with the fibre so as to initiate splitting, and the clamps of clamp-holders 23 and 24 bear with a slight pressure on flexible support 120, which thus slightly bends, and on fibre $F_1$, which thus is maintained in its position during the splitting initiation step.

In FIG. 1c cutting tool 8 is raised and the clamps supported by clamp-holders 23 and 24, due to the descent of movable slide 2, cause flexible support 120 to bend sufficiently for splitting fibre $F_1$.

FIG. 2 illustrates in detail the action of cam 73 by representing the cinematic characteristics of the device as shown with reference to cam 73 in the fixed state, so that the displacement of finger 16 and roller 21 is visualized in the form of rotation about the cam.

First, the cam is in position 0, i.e. roller 21 is tangent at point Y and diamond-pushing rod 16 is tangent at point Z. In this position clamp-holders 23 and 24 as well as cutting tool-holder 8 are raised. Fibre $F_1$ 1 is then placed into a V-shaped groove provided in flexible support 120.

Lever 30 is rotated clockwise by an angle of about 20°, which condition is represented in FIG. 2 by a 20° anti-clockwise rotation. This brings roller 21 to E and pusher rod 16 to E'. In this position the diamond is lowered, but does not yet engage the fibre. Movable slide 2 is lowered to a degree sufficient to cause the clamps supported by clamp-holders 23 and 24 to maintain fibre $F_1$ in the V-groove of flexible support 120. This position thus corresponds to a clamping of the fibre without scratching or slotting the same.

Further rotating lever 30 by 5° causes roller 21 to bear on point A', and pusher rod 16 to bear on point A. In this position the diamond of cutting tool-holder 8 engages fibre $F_1$ with a slight contact pressure, while movable slide 2 has remained in its previous position.

Further rotating the lever by 20° brings roller 21 to B' and rod 16 to B. In this position the diamond still engages the fibre so as to scratch it, while the movable slide still remains in its previous position.

A supplementary rotary displacement by 31° of the lever, and thus of the cam, brings roller 21 to C' and rod 16 to C. In this position the diamond of tool-holder 8 is raised with respect to the fibre, and movable slide 2 is still in the same position as before.

Still further rotating by 14° the lever and the cam causes movable slide 2 to raise and thus to liberate the now split fibre $F_1$ from the grip of the clamps supported by clamp-holders 23 and 24.

The split fibre can then be removed from the device which can be reloaded for the next splitting operation, by rotating in the opposite direction the lever over its entire stroke that corresponds in the above example to 90° anti-clockwise.

In a variant, when the device is in an intermediate position designated by H in FIG. 2 a catch provided on cam 73 will cause rod 16 to be held in position when the cutting tool is raised. Thus when lever 30 returns by reverse motion to its rest position in preparation of a consecutive splitting operation cutting tool-holder 8 is not purposelessly lowered once more.

According to FIG. 3a the device comprises a main body 1 on which a fibre rest-holder 3 is mounted, and an arm 22 is affixed to the latter. An axis 29 onto which lever 30 is mounted supports cam 73 and extends through fibre rest-holder 3 and main body 1. Rod 16 is biased downwardly by a spring 40 placed in a casing 40'. The upper portion of rod 16 engages an actuating lever pivotally connected at one of its ends to an axis 10 and biased by a pin-spring 11, while being pivotally connected at its other end to an axis 112 supported by diamond-holder 8. Thus the downward motion of rod 16 results in engagement of the diamond and the fibre, so that the latter can be scratched (or slotted).

Furthermore movable slide 2 is biased upwardly by springs 39. The downward motion of movable slide 2 results in the clamping of optical fibre F by the clamps 27 supported on clamp-holders 23 and 24. (cf. in particular FIGS. 3b and 3c).

FIG. 3c more particularly shows that during the bending of flexible support 120 the latter is maintained at its middle portion by an edge 84 of fibre rest-holder 3 in the zone wherein the scratching or scoring has been performed for initiating the splitting.

It is seen in FIG. 3d that lever 9 is mounted in a casing 91 of a support 4 which also carries casing 40' as well as a recess 93 defining a passage for diamond-holder 8.

According to FIGS. 4a to 4g movable slide 2 carries at its upper portion a vertical rim 62 which extends it in the upward direction, and a horizontal rim 64 which is extended by a vertical rim 63. Thus rims 62 to 64 define a recess 61 adapted to receive clamp-holder 23, 24, respectively. The latter have apertures 25' and 26' cooperating with apertures 62' of rim 62, and 63' of rim 63 by receiving half-axes allowing the clamp-holders to be rotated. The axis of rotation of said clamp-holders is located advantageously at the level of the upper part of flexible support 120 so as to correspond to the axis of fibre $F_1$. This arrangement allows the movements of the movable supports to be followed in an optimum manner by the clamp and clamp-holder assembly. Furthermore the lower edge 61' of each recess 61 receives the lower edge of flexible support 120.

Each one of the clamp-holders has a lower portion comprising two bevelled faces shown at 42 and 44 for clamp-holder 23, and at 41 and 43 for clamp-holder 24. As illustrated by FIGS. 1c and 3c, bevelled faces 41 and 42 are designed to limit the rotary motion of clamp-holders 23 and 24.

Clamp-holders 23 and 24 have a vertical wall 70 provided with a bore 25', and a vertical wall 69 provided with a bore 26' and extended by an upper portion provided with a threaded bore 52' for fixing the corresponding clamp 27. The mounting level, or height, of clamp 27 is accurately determined due to an upper horizontal rim 68.

Referring more particularly to FIGS. 4e, 4f and 4g it will be seen that each clamp 27 comprises a bore 52" adapted to receive a screw for fixing the clamp onto the corresponding clamp-holder. The clamps have each one at its lower end a profile 45 designed to apply fibre $F_1$ into the V-groove of flexible support 120. Profile 45 is shown in detail in FIG. 4g in which V-groove 49 receiving optical fibre $F_1$ is indicated by dashed lines. Profile 45 has a flat portion 46 delimited on either side by bevelled faces 47 forming with the horizontal an angle of 45°. When the lower face 48 of clamp 27 engages flexible support 120, profile 45 penetrates the V-groove 49 to a depth sufficient slightly to compress fibre $F_1$ so as to maintain it in the desired position without, however, deforming it to a degree involving the risk of deteriorating said fibre. It will be understood that in the zone wherein the fibre is clamped by clamps 27 it can keep its mechanical protection sheath, whereas the latter has to be removed in the zone in which the diamond initiates the splitting. At any rate clamp 27 simultaneously bears on flexible support 120 and on fibre $F_1$, so that comparatively great bending forces can be transmitted to the flexible support without, however, exerting any undesirable action on fibre $F_1$.

As shown in FIGS. 5a and 5b main body 1 has a central portion 1' provided with an aperture 29" through which axis 29 of cam 73 can pass, and two flanges 58 delimiting a space or recess in which movable slide 2 is slideably displaceable. At its upper portion main body 1 has two flanges 56 extending along piece 4. Flanges 56 extend backward and have at their lower portion a rim provided with a bore 57' allowing a screw 57 for fixing support 4 to pass, and a threaded bore 19' allowing an adjusting screw 19 to be mounted. The fibre rest-holder 3 shown in FIGS. 8a to 8d is fixed by screws extending through bores 81 and threaded bores 59 of main body 1. Fibre rest-holder 3 is provided with a bore 29' through which extends axis 29 of cam 73.

Movable slide 2 as shown in FIGS. 6a and 6b has a lower rim 67 provided with two blind holes 39' which receive the ends of springs 39, and with a bore 20' which receives axis 20 supporting roller 21, the position of which is adjustable by rotating the head 32 of screw 20. Rim 67 is extended by two vertical rims 65 defining a recess 67' which constitutes a housing or casing for cam 73. An upper bridging rim portion 66 located at the upper part of of vertical rims 65 is provided with a bore 16' through which extends rod 16. Vertical rims 65 are extended at their upper part by rims 62 and 64 forming a recess or casing 61 in which clamp-holders 23 and 24 are mounted, as indicated herein-above.

According to FIGS. 7a and 7b piece 71 forming a cam has an axis 29 receiving at one of its ends 70 lever 30, and at its opposite end a finger 74 which constitutes a stop member during the rotation of the cam so as to prevent the same from effecting a rotation of more than 90°. In the zone of the cam properly speaking, designated by reference numeral 73, a catch 76 is provided, the function of which will be explained herein-under.

From FIGS. 8a to 8e it becomes apparent that fibre rest-holder 3 has at its upper portion 82, on the one hand, a bore 35' through which extends a rod 35 biased by a spring 38 that cooperates with a catch 36 provided on rod 16, and on the other hand, a bore 16' through extends rod 16.

At the lower end of bore 35' a substantially rectangular aperture 36', 36" is provided, the portion 36' of which is substantially rectangular, said aperture being extended laterally at its upper part by its narrow aperture portion 36", and being closed at its lower end. When cam 73 is rotated catch 76 engages finger 36 (cf. point H in FIG. 2) supported by rod 16 and displaces said finger towards the right-hand side, said finger then passing through aperture 36' until it is raised into the non-active position wherein it extends through aperture 36".

At that time the cutting tool is in its raised position and cannot be brought into engagement with the fibre, unless the device is manually rearmed by acting on finger 36 so as to position it again in aperture 36'. When the finger is in the non-active position while lever 30 effects its return stroke, rod 16 is not actuated by the cam, and thus the diamond is not purposelessly lowered.

At its upper part the fibre rest-holder has a planar portion 84 which is adapted to receive flexible support 120 at its central portion and which presents on either side bevelled faces 85 that provide a certain clearance for the motions of flexible support 120 when it is being bent.

Referring more particularly to FIG. 8c it can be seen that fibre rest-holder 3 is closed at its upper end by a cap 89 which maintains flexible support 120 in place and allows the diamond to pass freely.

According to FIGS. 9a to 9c the generally parallelepipedic support 4 has at its upper portion a recess 91 adapted to receive a lever 9 pivotally mounted at one end by means of an axis which penetrates bores 10' of support 4 and 10" of lever 9, respectively. Bore 40' through which passes rod 16 downwardly biased by spring 40 opens into the lower part of recess 91. At the opening end of horizontal recess 91 a vertical recess 93 is provided which allows diaaond holder 8 to pass freely, said holder 8 being rotatively mounted on an axis 112. For this purpose lever 9 (cf. FIGS. 10a and 10b) is provided at one of its ends with two extensions 103 having each a fork 112' through which extends an axis that also extends through a bore 112" of diamond-holder 8. Diamond-holder 8 (cf. FIGS. 11a and 11b) is constituted by a square portion 110 extended by an embedded diamond 111.

Flexible support 120 is provided with a V-shaped groove 49 the central portion of which narrowed at 49' so as to form a "V" less high than, but coaxial to, the "V" 49, the fibre being stripped bare at the portion where the splitting is initiated.

With a view to stiffening the flexible support which is made of a plastic material, one or more foils 130 are advantageously placed under said support, as shown in FIG. 12c.

The invention is not limited to the embodiment shown and described herein. Many modifications and variants may be envisaged by those skilled in the art within the spirit and scope of the invention as defined in the appended claims.

We claim:

1. A device for splitting at leat one optical fibre, comprising:
   a flexible support for receiving said fibre;
   a tool for initiating the splitting at a location on said fibre;
   force exerting means for holding said fibre on either side of said location and for bending said flexible support, said force exerting means including at least two clamps;

said clamps being adapted to bear on said fibre and said flexible support so as to prevent any sliding displacement of said fibre and being rotated so as to cause said flexible support to be bent;

a cam for controlling the motion of said two clamps and said tool for initiating the splitting, said cam having profiles on opposite sectors, one of said sectors corresponding to the actuation of said two clamps and the other of said sectors corresponding to the actuation of said tool for initiating the splitting.

2. A device for splitting at least one optical fibre, comprising:

a flexible support for receiving said fibre;

a tool for initiating the splitting at a location on said fibre;

force exerting means for holding said fibre on either side of said location and for bending said flexible support, said force exerting means including at least two clamps;

said clamps being adapted to bear on said fibre and said flexible support so as to prevent any sliding displacement of said fibre and being rotated so as to cause said flexible support to bent;

a movable slide for controlling the motion of said two clamps and including an adjustable roller; and a cam acting in cooperation with said adjustable roller, for actuating said movable slide.

3. A device according to claim 2, wherein said two clamps are mounted each on a clamp-holder through which extends said flexible support and which is rotatively movable on said movable slide.

4. A device according to claim 3, wherein the axis of rotation of at least one clamp-holder is located substantially in the plane of said support.

5. A device according to claim 4, wherein said tool for initiating the splitting is also actuated by said cam.

6. A device according to claim 5, wherein said splitting tool is controlled by a rod cooperating with said cam and actuating a lever which carries said tool.

7. A device according to claim 6, wherein said cam has profiles provided on two opposite sectors thereof, one of said sectors corresponding to the actuation of said rod and the other sector corresponding to the actuation of said movable slide.

8. A device according to claim 7, wherein said slide is provided with an aperture adapted to receive said cam.

9. A device according to claim 2, wherein said cam has a cam profile adapted to cause the following sequence to be performed:

clamping said optical fibre and pre-bending said flexible support;

lowering said tool for initiating the splitting of said optical fibre;

raising said tool; and bending said flexible support until the splitting of said fibre is performed.

* * * * *